Oct. 14, 1958 S. UNTERMYER 2,856,337
METHOD OF OPERATING NUCLEAR REACTORS
Filed Sept. 21, 1956
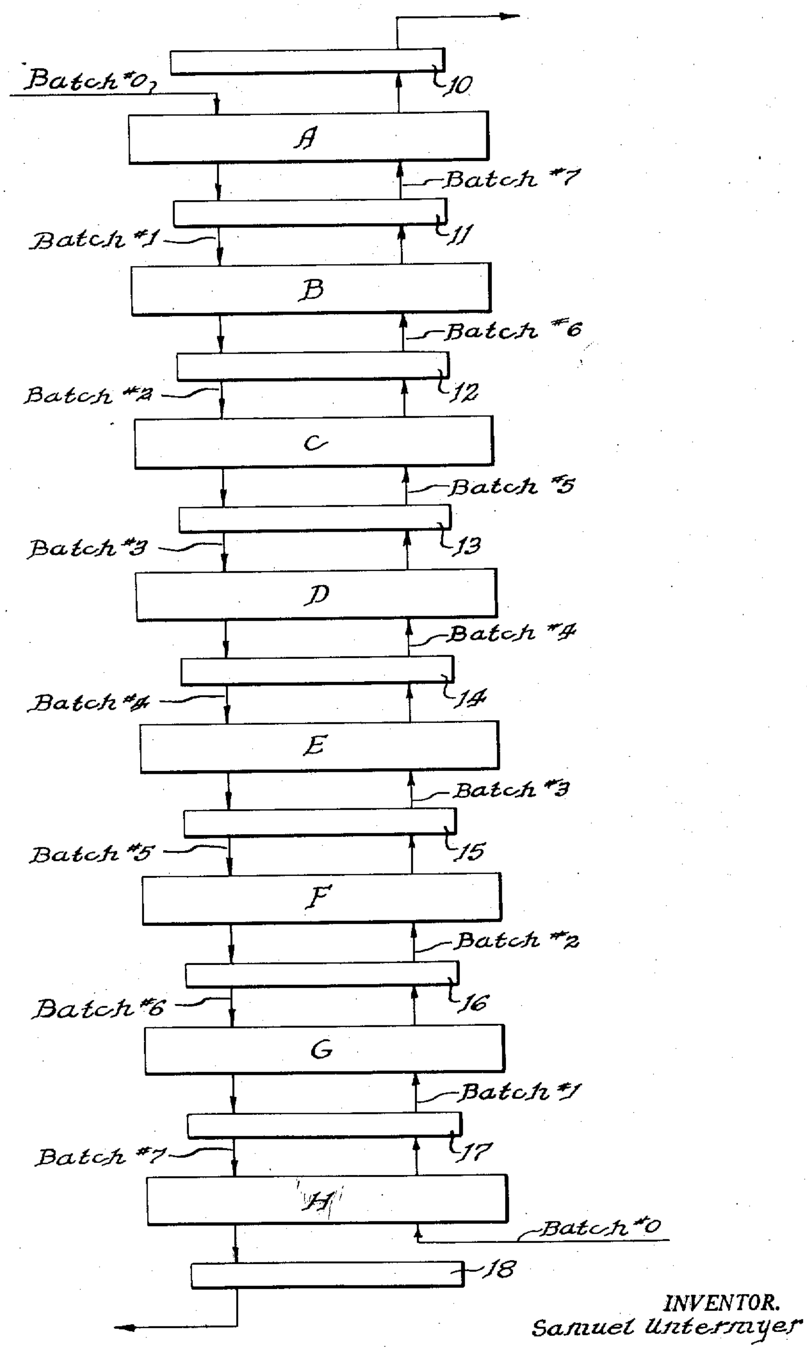
INVENTOR.
Samuel Untermyer
BY
Roland A. Anderson
Attorney United States Patent Office 2,856,337

Patented Oct. 14, 1958

2,856,337

METHOD OF OPERATING NUCLEAR REACTORS

Samuel Untermyer, Atherton, Calif., assignor to the United States of America as represented by the United States Atomic Energy Commission Application September 21, 1956, Serial No. 611,396

3 Claims. (Cl. 204—154.2)

The present invention relates to a method of operating nuclear reactors to obtain enhanced utilization of the component of the fuel which is fissionable by neutrons of thermal energy.

Most nuclear reactors now constructed or in the planning stage employ uranium as fuel. As is well known today it is the isotope of uranium of atomic weight 235 which is fissionable by neutrons of thermal energy and this isotope is therefore the active material in nuclear reactors. This isotope is present in natural uranium to the extent of .71%.

Uranium fueled nuclear reactors may be charged with natural uranium, depleted uranium, or enriched uranium. Depleted uranium contains less $U^{235}$ than does natural uranium and enriched uranium contains more.

Natural uranium reactors may be operated with either graphite or heavy water ($D_2O$) as moderator. This invention applies primarily to $D_2O$-moderated reactors because only in such reactors is there a large excess reactivity when operating with natural uranium as fuel. $D_2O$-moderated reactors may therefore be operated with depleted uranium as fuel.

One of the uses of nuclear reactors is to irradiate materials. In this manner radioactive isotopes may be formed for all elements with the exception of helium. Radioactive isotopes produced by nuclear reactors are receiving large commercial interest, particularly such isotopes as $H^3$, $C^{14}$, $T^{32}$, $S^{35}$, $I^{131}$, $Pu^{239}$ and $Po^{210}$. Actually any material formed by the absorption of neutrons is a possible product of a reactor used according to the present method. However, these reactors are primarily useful for the conversion of materials to tritium, polonium and plutonium.

Heterogeneous reactors employing natural uranium as fuel are frequently used for the conversion of isotopes. In such reactors plutonium may be bred for future use as a reactor fuel material. The fuel elements are irradiated in a reactor for a predetermined time and are then removed from the reactor and processed to recover the plutonium and fission products.

The fuel elements must be removed from the reactor long before all of the fissionable isotope of uranium is utilized. This is true for two reasons. First, the fission products, consisting of a considerable number of different nuclei, accumulate in the core of the reactor. All of these nuclei are able to capture neutrons and therefore compete with the fission process. When the proportion of neutrons lost in this manner becomes too great, the chain reaction can no longer be sustained. And second, there is a limit to the useful operating time of the reactor since a point may be reached when the plutonium is being lost, as a result of fission and radiative capture, as fast as it is formed. Operation of the reactor after this point is reached does not result in the production of additional plutonium.

Therefore, the depleted uranium is processed to remove fission products and plutonium therefrom and the uranium remaining is reformed into fuel elements and replaced in the reactor for reuse as fuel. This procedure is repeated until the mass of uranium will no longer sustain a chain reaction, at which time it is discarded. During the early stages of operation when the reactor is operating on natural or slightly depleted uranium, there are excess neutrons available which are not available when the reactor is operated on depleted uranium. Excess neutrons are, of course, those neutrons which must be absorbed by a control rod. This is the conventional manner of operation of natural uranium fueled reactors. It is found that the uranium will no longer support a chain reaction after 31% of the $U^{235}$ is utilized. Therefore the fuel must be discarded although it still contains 69% of the total $U^{235}$ which was present in the starting material.

Another manner of operating such reactors is to discard about 6% of the material during each reprocessing cycle and add natural uranium to make up the new charge. The reactors in this manner run on depleted material and no excess neutrons are available so that plutonium production is greater per mass of $U^{235}$ burned. However, the reactors also run at reduced power and 69% of the $U^{235}$ is discarded as in the conventional method. It would, of course, be highly desirable to utilize the fissionable isotope to a greater extent than this before the fuel must be discarded.

It is the primary object of the present invention to provide a method for the operation of a plurality of nuclear reactors designed to operate on natural uranium as fuel whereby enhanced utilization of the $U^{235}$ content of the fuel is obtained.

It has been found that greater utilization of the $U^{235}$ can be obtained if a number of reactors are operated each having a $U^{235}$ content necessary to sustain a nuclear chain reaction, this average $U^{235}$ content being produced in each case by equal quantities of uranium of $U^{235}$ content higher and lower than the average. As the uranium is depleted by operation of the reactors, the reactors are periodically reloaded to restore the average concentration, uranium being removed from the system and replaced with natural uranium when it is depleted to the point where it will no longer sustain a chain reaction when combined with an equal quantity of natural uranium.

The invention will now be described by reference to the accompanying drawings which represent a flow sheet of the method involving the use of a system of eight nuclear reactors. Each of these nuclear reactors may be, for example, similar to the reactor disclosed in application Serial No. 500,706, filed April 11, 1955, in the name of Samuel Untermyer, which is natural-uranium fueled and heavy-water moderated. Another suitable reactor is the natural-uranium heavy-water reactor described in Fermi et al. Patent No. 2,708,656. Each reactor will be operated to the same degree of $U^{235}$ burnout.

As can be seen from the flow sheet, reactors A and H are each charged with equal quantities of uranium of batch 0 and of batch 7—the batch number indicating the number of runs through a reactor that particular batch has made. It is necessary that the combined charge contain sufficient fissionable material to sustain the chain reaction. In the case of the reactor disclosed in the above cited application this amounts to 80% of the $U^{235}$ contained in natural uranium or .57% $U^{235}$. Reactors B to G will of course be operated at the same time with charges of uranium of varying degrees of depletion but with approximately the same total content of fissionable material.

The proportionate amount of $U^{235}$ necessary to support a chain reaction may be determined mathematically in advance of actual operation as follows:

Since $$(1)\quad \eta\ (\text{natural uranium}) = \frac{(\sigma_a)_{235}\eta_{235}}{(\sigma_a)_{235}+\frac{N_{238}}{N_{235}}(\sigma_a)_{238}} = \frac{650\times 2.12}{650+140\times 2.75}=1.33$$

where $\eta$=average number of fast fission neutrons emitted as a result of the capture of one thermal neutron in fuel material.

N=number of atoms of $U^{238}$ and $U^{235}$ respectively, and $\sigma_a$=microscopic absorption cross section.

Then for uranium of X times normal $U^{235}$ content $$(2)\quad \eta=\frac{650\times 2.12}{650+\frac{140\times 2.75}{X}}$$

By the four factor formula $$K=\eta\epsilon pf$$

where

K is the multiplication factor,
$\eta$ is defined above,
$\epsilon$ is the fast fission factor,
$p$ is the resonance escape probability, and
$f$ is the thermal utilization.

We assume that $\epsilon pf$ changes only slightly with $U^{235}$ concentration. This assumption is justified to a close approximation since as the uranium is depleted $\epsilon$ will increase very slightly, $p$ will decrease slightly and $f$ will remain constant. Therefore the quantity $\epsilon pf$ within the range of concentrations under consideration will effectively remain constant.

Therefore $$(3)\quad K_d=K_n\frac{\eta_d}{\eta_n}$$

where the subscript $d$ refers to depleted concentration and subscript $n$ to natural.

From Formulas 1 and 2 we have $$\frac{K_n}{K_d}=\frac{650+\frac{385}{X}}{650+385}$$

$$X=\frac{385}{1035\frac{K_n}{K_d}-650}$$

From page 42 of the hereinbefore mentioned application Serial No. 500,706 we know that $K_n$=1.137 and we know that the minimum feasible operational $K_\infty$ for a $D_2O$ reactor is 1.04.

Therefore we find that for the reactor described $X$=80% and the reactor will operate on uranium depleted to the extent that only 80% of the original $U^{235}$ is present.

After operation of each reactor for the optimum time the fuel elements will be removed therefrom and processed to recover plutonium and fission products therefrom. The processing will be done by systems 10–18 which may of course form part of a single plutonium recovery plant. The necessity for separate systems arises from the necessity for segregating the different grades of uranium during processing. The completely depleted uranium obtained from reactors A and H is then discarded. The remainder of the uranium is reformed into fuel elements and used to charge the next reactor in the series; that is, the uranium of batch 0 becomes batch 1 after use in reactors A and H and after reprocessing is used to charge reactors B and G and so forth—each batch of uranium after a run in a reactor and reprocessing being used to charge the next reactor in the series.

The reactors are charged with the uranium of different degrees of depletion in as near a homogeneous arrangement as can be obtained. The fuel elements may be formed of different sizes to facilitate separation and segregation of different batches, or the reactors may be charged in a known pattern of less depleted and more depleted fuel elements so that the elements may be of the same size.

*Table I*

| Batch No. (No. of Times Irradiated) | Percent of Normal $U^{235}$ Content | Percent $U^{235}$ |
|---|---|---|
| 0 | 100 | 0.71 |
| 1 | 94 | 0.67 |
| 2 | 88 | 0.62 |
| 3 | 83 | 0.59 |
| 4 | 78 | 0.55 |
| 5 | 73 | 0.52 |
| 6 | 69 | 0.49 |
| 7 | 65 | 0.46 |
| 8 | 61 | 0.43 |

Table I illustrates how the uranium is gradually depleted by passage through 8 reactors where each reactor is operated till 6% of the $U^{235}$ in the charge is burned up. Reactor A being charged with equal quantities of batch 0 and of batch 7 has an average percent $U^{235}$ of .58%. Reactor B likewise has an average percent $U^{235}$ of .58%, and so on. These charges of fuel contain 80% or more of the normal $U^{235}$ content of natural uranium. Based on the $K_\infty$ of 1.137 given in the above cited application this percentage of normal content is sufficient to maintain a chain reaction. It will be noted that the fuel is not discarded until the percent of the normal $U^{235}$ content is reduced to 61%. Under these conditions these reactors will operate at reduced power and maximum plutonium will be produced per kg. of feed. There are no excess neutrons so maximum plutonium is produced per unit of power.

The above description is for a system of 8 reactors wherein 6% of the $U^{235}$ is depleted in each run. To generalize the description we may say that there are $n$ reactors wherein $a$ is the fraction of $U^{235}$ burnup in each reactor. Therefore the first and the $n^{th}$ reactors are charged with equal weights of natural uranium and of uranium depleted in $U^{235}$ to the extent where it contains $(1-a)^{n-1}$ times the normal $U^{235}$ content of natural uranium, the second and $(n-1)^{st}$ reactors are charged with equal weights of uranium containing $(1-a)$ times the normal $U^{235}$ content of natural uranium and of uranium containing $(1-a)^{n-2}$ times the normal $U^{235}$ content of natural uranium, and so on, for each of the $n$ reactors.

Each of the reactors is operated to a $U^{235}$ burnup of $a$, after which the fuel is reprocessed to remove plutonium and fission products therefrom and the uranium most depleted in $U^{235}$ is discarded. The remaining uranium is formed again into fuel elements and together with a new charge of natural uranium is recharged into the reactors so that each reactor will have sufficient fuel to maintain a chain reaction. For a reactor constructed near optimum conditions so that the $K_\infty$ of the reactor is higher than 1.137, the utilization of the $U^{235}$ according to this process is higher than that shown. For example, the maximum feasible $K_\infty$ for a reactor of the type shown in the application with natural uranium is 1.18. With such reactors the uranium need not be discarded until 50% of $U^{235}$ content is utilized.

It is evident therefore that the entire process produces utilization of the uranium to a point of advanced depletion beyond the capability of the present systems.

Operation of the continuous cycle as described, of course, cannot be carried out until fuel of different degrees of depletion is available. This may be obtained by operating reactors in the conventional fashion as described above or by employing uranium which has had a portion of its $U^{235}$ content removed for use in reactors operating on enriched fuel.

What is claimed is:

1. A method for obtaining enhanced utilization of natural uranium in nuclear reactors comprising charging a nuclear reactor with an equal number of fuel elements formed of natural uranium and of fuel elements formed of uranium depleted in $U^{235}$ to the extent that the combination will just support a chain reaction, operating the reactor until the rate of burnup of plutonium equals its rate of production, processing the fuel elements to recover plutonium, discarding the depleted uranium, reforming the remaining uranium into fuel elements, charging these fuel elements into a reactor along with an equal number of fuel elements formed of uranium depleted in $U^{235}$ to the extent that the combination will just support a chain reaction, and continuing reuse of the uranium as aforesaid until it will no longer support a chain reaction when combined with an equal quantity of natural uranium.

2. A method of operating a group of $n$ heavy-water-moderated heterogeneous nuclear reactors designed to operate with natural uranium as fuel to obtain enhanced utilization of the $U^{235}$ content of the natural uranium, comprising charging the first and the $n^{th}$ reactors with equal weights of natural uranium and of uranium depleted in $U^{235}$ to the extent where it contains $(1-a)^{(n-1)}$ times the normal $U^{235}$ content of natural uranium where $a$ is the fraction of $U^{235}$ burnup in each reactor, charging the second and $(n-1)^{st}$ reactors with equal weights of uranium containing $(1-a)$ times the normal $U^{235}$ content of natural uranium and of uranium containing $(1-a)^{(n-2)}$ times the normal $U^{235}$ content of natural uranium and so on for each of the $n$ reactors, operating each reactor to a $U^{235}$ burnup of $a$, processing the fuel to remove plutonium and fission products therefrom, discarding the uranium most depleted in $U^{235}$, recharging the reactors with the reprocessed fuel and a new charge of natural uranium to make up for that discharged from the system, and continuing the cycle as described hereinbefore.

3. A method of operating a group of eight heavy-water-moderated heterogeneous nuclear reactors designed to operate with natural uranium as fuel to obtain enhanced utilization of the $U^{235}$ content of the fuel comprising charging the first and the eighth reactor with equal weights of natural uranium and uranium containing 65% of the $U^{235}$ contained in natural uranium, charging the second and seventh reactors with equal weights of uranium containing 94% and 69% respectively of the $U^{235}$ contained in natural uranium, charging the third and sixth reactors with equal weights of uranium containing 88% and 73% respectively of the $U^{235}$ contained in natural uranium, charging the fourth and fifth reactors with equal weights of uranium containing 78% and 83% respectively of the $U^{235}$ contained in natural uranium, operating said reactors till 6% of the $U^{235}$ content thereof is burned up, discarding the uranium most depleted in $U^{235}$, processing fuel to remove therefrom the plutonium and fission products formed therein and recharging the reactors so that each reactor contains the same charge as that given above.

References Cited in the file of this patent

Amorosi et al.: "Peaceful Uses of Atomic Energy," vol. 3, pages 133–142, August 1955.